United States Patent [19]

Ostgaard et al.

[11] 4,000,701
[45] Jan. 4, 1977

[54] MANNED WELDING AND INSPECTION VEHICLE

[76] Inventors: John T. Ostgaard, 7855 Vicksburg Ave., Los Angeles, Calif. 90045; James M. Doornbos, 412 S. Locust, Compton, Calif. 90221; John E. Bartley, 216 Lake Drive, Aptos, Calif. 95003; Cor de Lange, Yacht Haven, Berth 202, Wilmington, Calif. 90744

[22] Filed: July 3, 1975

[21] Appl. No.: 592,984

[52] U.S. Cl. .............................. 104/138 R; 243/39
[51] Int. Cl.² ........................................ B65G 51/04
[58] Field of Search ............ 180/9.2 R; 104/138 R, 104/138 G, 139, 155; 243/32, 33, 38, 39; 105/365; 254/134.5

[56] References Cited
UNITED STATES PATENTS

| | | | |
|---|---|---|---|
| 3,722,428 | 3/1973 | Alexandrov | 104/138 R |
| 3,758,050 | 9/1973 | Watts | 243/39 |
| 3,787,007 | 1/1974 | Alexandrov | 243/39 |

*Primary Examiner*—M. H. Wood, Jr.
*Assistant Examiner*—John A. Carroll
*Attorney, Agent, or Firm*—Harris, Kern, Wallen & Tinsley

[57] ABSTRACT

A manned welding and inspection vehicle for working within the interior of a pipeline or the like, the vehicle including two annular seals for aligning the vehicle in the pipeline and for sealing portions of the environment about the vehicle. The vehicle also includes an automatic welding system, the welding head of which is located in the front end of the vehicle and capable of welding a 360° arc. The welding head also includes a fine adjustment mechanism to compensate for misalignments. Driven by the engine of the vehicle is a driving mechanism which is rugged and compact, and a fan for creating the proper air flow around the vehicle without disturbing the air flow at the welding site.

26 Claims, 8 Drawing Figures

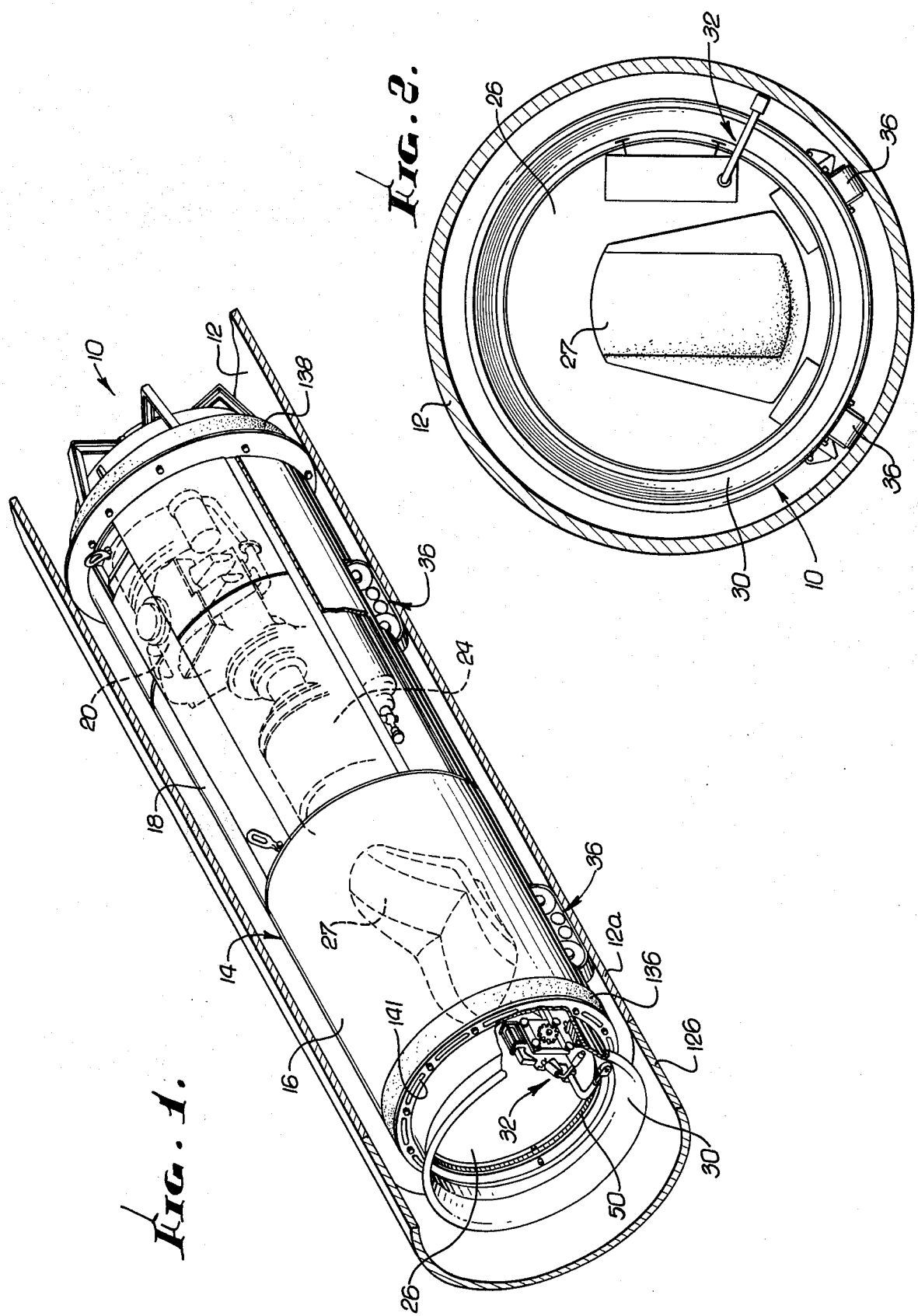

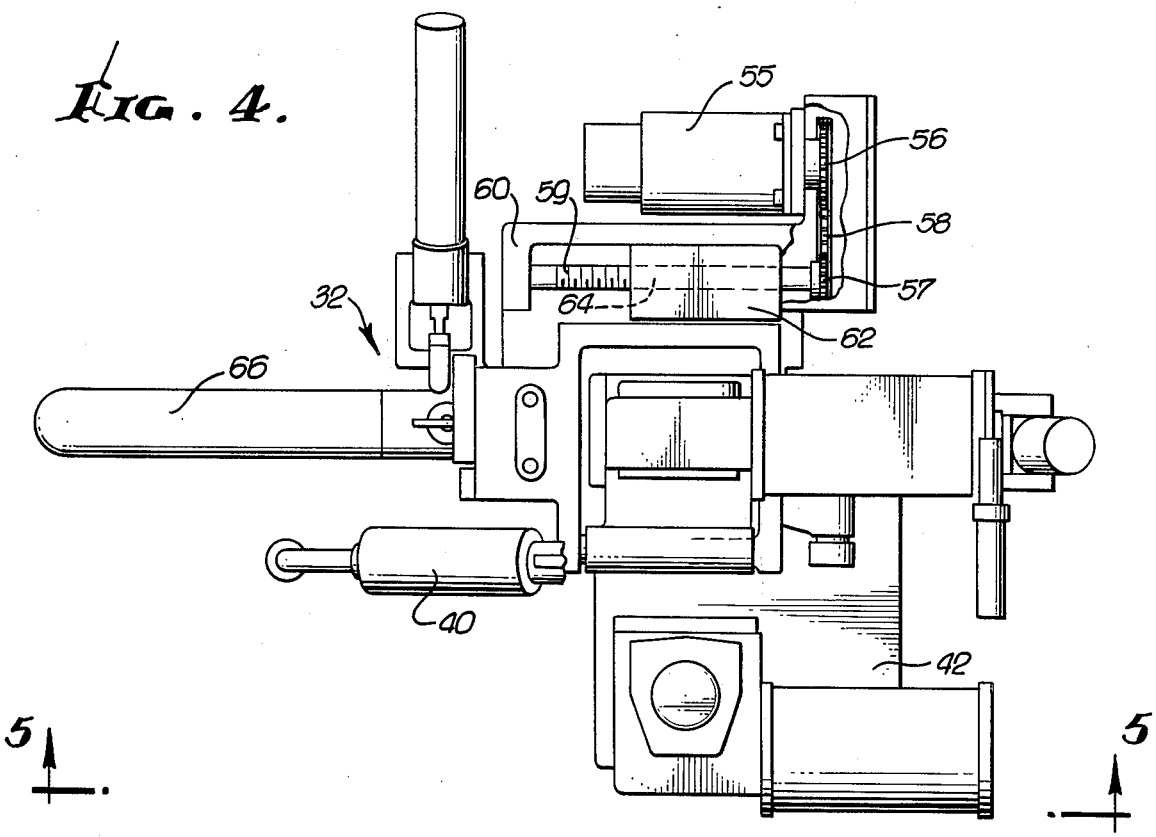

MANNED WELDING AND INSPECTION VEHICLE

BACKGROUND OF THE INVENTION

1. Field of the Invention

The present invention relates to a vehicle and some of its parts and more particularly to a manned welding and inspection vehicle for moving through a large-diameter conduit or pipe to perform welding and inspection procedures on said pipes. The invention also includes the housing used for the vehicle and more particularly the structure of the housing for the purpose of creating a predetermined air flow around the vehicle for removing welding gas and for cooling the power source of the vehicle. Additionally, the invention relates to the driving mechanism including a clutch apparatus for the vehicle; the driving mechanism allows the application of sufficient power to cause movement of the vehicle and yet the mechanism is in an extremely compact package. Further, the invention relates to an adjustment mechanism for the welding head of the vehicle to provide versatility as well as superior welding results.

2. Description of the Prior Art

The current energy shortage as well as the ever-increasing use of natural resources have resulted in the need for the construction of long pipelines of large diameter. The best current example is commonly referred to as the "Alaskan Pipeline," a pipeline for the movement of oil from the Alaskan North Slope at Prudhoe Bay to the Southern Coast at Valdez, some 800 miles, for shipment by tankers. Other large pipelines are also being constructed or planned for oil as well as gas.

To date, much of the welding of pipeline is done manually. However, manual welding is expensive, time consuming, and results in inconsistent welding quality. Furthermore, in a hostile environment, such as that existing in Alaska, simply administering large groups of manual welders is extremely difficult and expensive.

Some automatic welding equipment has been developed, but to date their record is spotty. It is still difficult to get good quality welds and machinery failure is still common. Also, existing automatic welders are generally of the type which weld iron outside of the pipeline, while it is desirable to have an inside weld capability. Further, present pipeline welding procedure usually entails the digging of a ditch for the pipeline (where the pipeline is to be placed into or underground), placing the pipes immediately alongside the ditch, welding the pipes together and then lowering the pipes into the ditch. Because of the stresses induced in the pipes upon movement, it would, of course, be more desirable to perform at least some of the welding procedure after the pipes are in their permanent location.

SUMMARY OF THE INVENTION

The present invention overcomes the problems referred to hereinabove by providing for a manned welding and inspection vehicle for movement through the interior of large-diameter conduits or pipes for welding the pipes end to end quickly and efficiently, the vehicle comprising a frame; a housing extending about the frame; a power source mounted to the frame and located within the housing at a rearward portion thereof; a generator coupled to the power source within the housing; an operator's chamber located within the housing at a forward portion thereof; a welding system, a portion of which is connected to the housing at the forward portion thereof in front of the operator's chamber; and a driving system connected to the housing for moving the vehicle through the conduits.

As mentioned, the invention also includes various sub-combinations of the vehicle to be described hereinbelow.

It is an aim of the present invention to provide an apparatus for substantially shortening the time to weld large-diameter pipes or conduits and yet achieve a consistently high-quality weld. Another aspect of the present invention is to provide an apparatus which is compact, simply constructed and yet is totally reliable even in hostile climatic environments. Still another object of the present invention is to provide a vehicle which is capable of moving through the interior of large-diameter pipes and having provisions for carrying an operator so that welding and inspection of the pipes can be effectively and efficiently carried out. Yet another aim of the present invention is to provide a welding and inspection vehicle which is extremely rugged.

Other objects and advantages of the invention will appear from the following description taken in conjunction with the accompanying drawings.

BRIEF DESCRIPTION OF THE DRAWINGS

FIG. 1 is a perspective view of the manned welding and inspection vehicle of the present invention, partially broken away and shown situated in the interior of a pipeline.

FIG. 2 is an enlarged, elevational sectional view of the front end of the manned welding and inspection vehicle.

FIG. 4 is an enlarged plan view of the vehicle's welding head.

FIG. 5 is an elevational view of the vehicle's welding head taken along line 5—5 of FIG. 4.

DESCRIPTION OF THE PREFERRED EMBODIMENT

Figure 3:
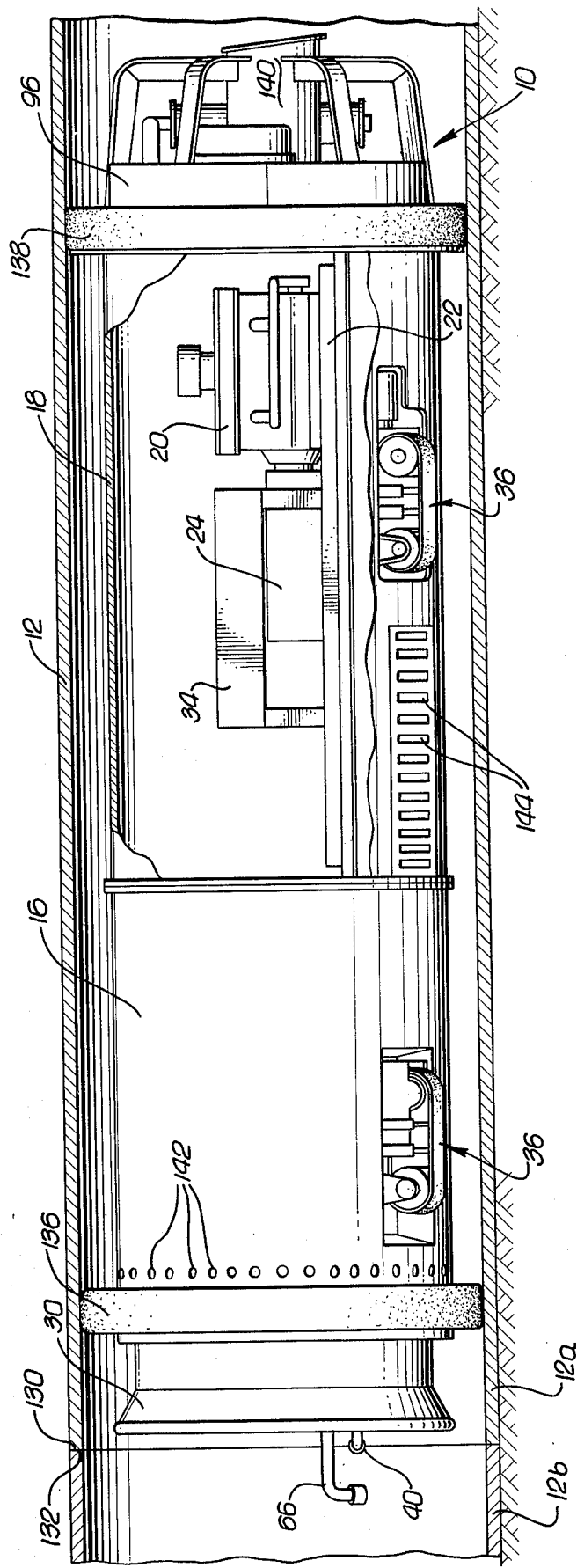
FIG. 3 is a side elevational sectional view of the vehicle aligned in the pipeline with the vehicle being partially broken away.

While the present invention is susceptible to modifications and alternative constructions, an illustrative embodiment is shown in the drawings and will be described in detail hereinbelow. It should be understood, however, that it is not the intention to limit the invention to the particular form disclosed; but on the contrary the intention is to cover all modifications, equivalences, and alternative constructions falling within the spirit and scope of the invention as expressed in the appended claims.

An important aspect of the present invention is to provide a vehicle which is simply constructed, yet compact and rugged for work within pipelines, especially in hostile climatic environments. Referring now to FIGS. 1, 2 and 3, there is illustrated a manned welding and inspection vehicle 10 within a pipeline 12. The vehicle has a generally cylindrically shaped housing 14 which for convenience's sake may be divided between a forward portion 16 and a rearward portion 18. Within the rearward portion of the housing there is located the power source of the vehicle in the form of a diesel engine 20 mounted to a frame 22. Coupled to the engine 20 is a generator 24 located slightly forward of the engine.

Within the forward portion 16 of the housing is an operator's chamber 26 containing a seat 27 for an operator as well as various controls (not shown) for the vehicle. At the front end of the vehicle there is a frustrum-shaped nose 30 and rotatable about its inner surface is an automatic welder assembly 32. The welder assembly 32 is part of a welding system which also includes a welding power supply designated generally with the numeral 34 and includes the usual transformers, inductor, reactor and rectifiers.

Another important part of the vehicle is a driving system of which a driving mechanism 36 makes contact with the interior of the pipeline 12 to allow movement of the vehicle therealong.

Referring now to FIGS. 4 and 5, there is illustrated more in detail the welder assembly 32. The welder assembly includes a welding head 40 mounted to a bracket 41 which is pivotally connected to a support structure 42. Pivoting occurs about an axis which is coincident with the longitudinal axis of a pin 44. The support structure includes two guide arms 45 and 46 and a pinion 48 which cooperate with an annular track 50 (See also FIG. 1.) having a rack 51 along which the pinion rotates and two lateral grooves 52 and 54 which receive the guide arms 45 and 46 respectively. The just-described mechanism allows the welder assembly to cover an arc of 360° in two movements for complete welding of the abutting ends of two pipes 12a and 12b. The welding head is not only pivotable but also translatable in a direction parallel to the longitudinal axis of the pipeline to allow for fine adjustment of the welding head to compensate for any misalignment which may be engendered.

A fine adjustment mechanism is part of the welder assembly and comprises a motor 55 for providing a rotational motion to a transmitting means in the form of two sprockets 56 and 57 connected by a belt 58. The rotational motion from the sprocket 57 is transmitted to a rotatable screw element 59 which is mounted to a mounting bracket 60 so as to allow only rotational movement of the screw. Translatable along the screw is a block 62 having a threaded opening 64 for receiving the screw 59. The block in turn is connected to the bracket 41 so that when the screw is rotated the block is movable therealong, causing the welding head 40 to move in a similar manner. By allowing the fine adjustment of the welding head, slight eccentricities caused by an off-round pipe end or a slight misalignment of the vehicle can be compensated for by the operator.

To help achieve alignment, there is attached to the support 42 a guide element 66 which is spaced from the welding head to roll along the interior surface of the pipe 12b while the vehicle is situated in the adjoining pipe 12a.

Figure 6:
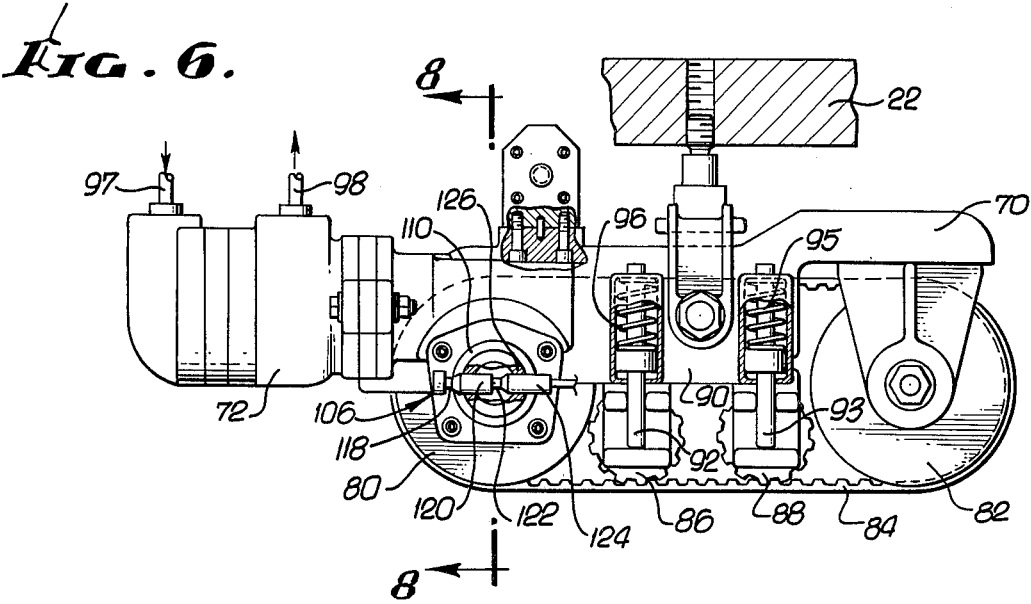
FIG. 6 is an enlarged elevational view of the driving mechanism which propels the vehicle in the pipeline.
Figure 7:
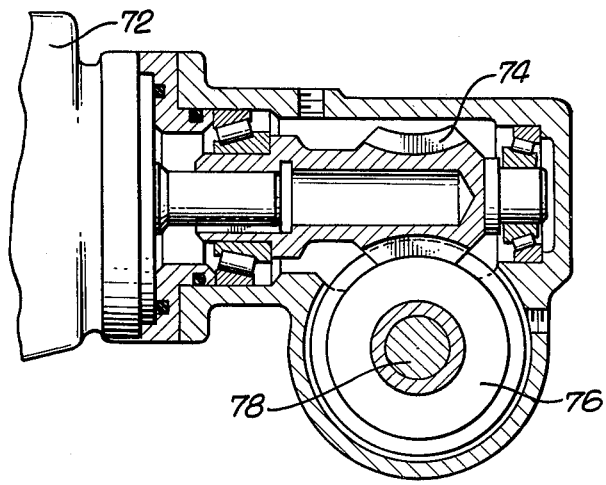
FIG. 7 is an enlarged elevational sectional view of a portion of the driving mechanism illustrating the double enveloping worm gear set used to transmit power from the motor to a driving pulley.
Figure 8:
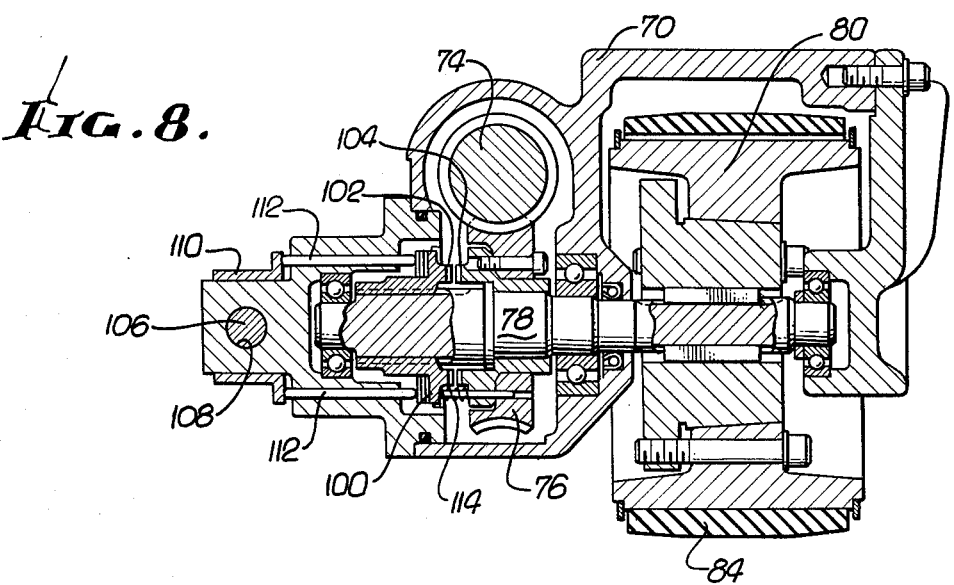
FIG. 8 is an elevational sectional view of the clutch mechanism taken along line 8—8 of FIG. 6.

It is a major aim of the present invention to provide a compact, rugged and yet reliable apparatus. Helping to accomplish this, reference is made to FIGS. 6, 7 and 8 which illustrate in detail the driving mechanism used to move the vehicle through the pipeline to be welded or inspected. The driving mechanism comprises a frame 70 to which is attached a hydraulic motor 72.

Connected to the shaft of the hydraulic motor is a worm 74 which engages a worm wheel 76. In order to transmit the necessary power to move the relatively heavy manned vehicle, this worm-worm wheel combination (commonly known as a double enveloping worm gear set) is highly efficient to achieve the compact yet rugged results necessary. In turn, the worm wheel is mounted on a shaft 78 to which is also mounted a drive pulley 80. Also connected to the frame 70 is a follower pulley 82 which cooperates with the drive pulley 80 to support a driving belt 84.

To insure belt contact with the interior surface of the pipeline, two idler rollers 86 and 88 are also connected to the frame 70 by way of a bracket 90. The bracket 90 is mounted to the frame by pins 92 and 93 around which are located compress on springs 94 and 95. The compression springs function to provide a biasing force downwardly on the rollers 86 and 88 which in turn act with the pulleys 80,82 to keep the contacting surface of the driving belt 84 firmly against the interior of the pipeline.

The motor 72 is hydraulically operated. A fluid reservoir 96, FIG. 3, is located near the rear of the vehicle. In the usual manner, a pump driven by the diesel engine provides for the movement of the fluid through hoses 97,98 to and from the motor 72.

Also included as part of the driving mechanism is a clutch comprised of a curvic coupling 100 having gear teeth 102 at one end to engage a second gear coupling 104 which is formed integral with the worm wheel 76. Also included is a laterally movable clutch pin 106 which is received through an opening 108 in an annular collar 110. Positioned between the collar and the coupling 100 is a number of longitudinally extending pins 112. Mounted to the worm wheel 76 for biasing the coupling is a compression spring 114.

The clutch pin 106 is divided into four portions, a first portion 118 having a small diameter, a second portion 120 having a large diameter, a third portion 122 having a small diameter and a fourth portion 124 having a large diameter. The collar 110 includes an annular surface 126 which is engaged alternately by the first and third sections 118 and 122 or the second and fourth sections 120 and 124. As can now be appreciated, when the large diameter sections 120 and 124 become engaged with opposite parts of the annular surface 126, the collar is moved inwardly longitudinally (to the right as viewed in FIG. 8), pressing upon the pins 112 to cause the coupling 100 to engage the coupling 104. However, when the clutch pin is moved so that the small diameter first and third sections are engaged with the collar surface, then the collar is moved in the reverse longitudinal direction under the influence of the compression spring 114. This also moves the coupling 100 so that it is no longer in engagement with the coupling 104.

The clutch pin may be moved in its lateral direction simply by moving a cable (not shown) operable by T-handles (not shown) located in the operator's chamber.

In operation, the vehicle 10 is located within the pipe 12a which abuts the pipe 12b. In the alternative, several sections of pipes may have already been welded externally. Under its own power, the vehicle moves to a position so that the welder assembly 32 is immediately adjacent the abutting pipe ends 130 and 132, FIG. 3.

The vehicle is equipped with two annular inflatable seals 136 and 138 located near each end of the vehicle.

For example, the front seal 136 is located just inboard of the frustrum 30 while the rear seal 138 is located just inboard of a fan 140. Once the operator is satisfied with the location of the vehicle, the seals are inflated so as to have their outer surfaces engage the interior surfaces of the pipe. Not only does this seal portions of the vehicle from other portions, but the vehicle is concentrically aligned with the pipe.

The welding process can then begin in the usual well-known fashion, including the provision of inert gases such as argon and $CO_2$ to the welding location. In order to exhaust the inert gases and keep the engine exhaust gases from reaching the operator, the fan 140 provides a rearward flow of air. In order to properly conduct the airflow, however, there is a need to understand that the airflow immediately adjacent the welding site must not exceed 12 to 15 miles per hour or the inert welding gases will be swept away. Nevertheless, there must be a sufficient air flow along the vehicle to provide cooling. This is accomplished by providing passages such as passage 141, FIG. 1, between the housing and the inflated front seal 136. Air flow is routed under the front seal and through a plurality of openings 142, FIG. 3 and along the outer surface of the forward portion 16 of the vehicle. Vents 144 are provided in the rearward portion 18 of the vehicle so that the air may enter the interior of the rearward portion, thereby moving past the rear seal 138 to be exhausted by the fan in a rearward direction. The purpose of the passages 141 and the openings 142 is to restrict the flow of air and thereby increase the air velocity enough to provide the volume of air necessary for cooling purposes and yet not disturb the gases at the weld site sufficient to interfere with the quality of the weld being performed.

What has been described is a vehicle which substantially shortens the time needed for welding when compared with that of manual welding. Furthermore, what has been described produces a consistently superior weld when compared to the relatively erratic welds produced manually. All of this has been accomplished with a relatively simply constructed vehicle which is compact, rugged and yet reliable so as to minimize down time.

It is also to be understood that the vehicle 10 may be used for inspection purposes such as by having the vehicle tow an X-ray unit through the interior of the pipeline whereby the welds of the pipeline may be inspected for reliability control purposes.

What we claim is:

1. A manned welding and inspection vehicle for movement through the interior of large-diameter pipes for welding said pipes end to end quickly and efficiently, said vehicle comprising:
 a frame;
 a housing extending about said frame;
 a power source mounted to said frame and located within said housing at a rearward portion thereof;
 a generator coupled to said power source within said housing;
 an operator's chamber located within said housing at a forward portion thereof;
 a welding system, a portion of which is connected to said housing at the forward end thereof in front of said operator's chamber; and
 a driving system connected to said housing for moving said vehicle through said pipes.

2. A vehicle as claimed in claim 1 including:
 a fan located at the rear of said housing; and
 wherein said generator is located between said power source and said operator's chamber; and
 the front end of said housing is generally frustum-shaped.

3. A vehicle as claimed in claim 1 wherein said housing comprises:
 an elongated generally tubular shape with a first end portion and a second end portion;
 a fan mounted to said second end portion for moving air from said first end portion toward said second end portion;
 first sealing means attached at said first end portion for restricting the flow of air along said housing;
 second sealing means attached at said second end portion for restricting the flow of air along the exterior of said housing;
 a plurality of velocity-increasing openings formed in said housing in communication with an air passage around said first sealing means, said openings located between said first and said second sealing means; and
 vent openings formed in said housing between said velocity-increasing openings and said second sealing means for directing air to the interior of said housing.

4. A vehicle as claimed in claim 1 wherein said housing comprises:
 an elongated generally tubular shape with a first end portion and a second end portion;
 a first sealing means attached at said first end portion and a second sealing means attached at said second end portion; and
 said first sealing means and said second sealing means for restricting air flow along said housing and for aligning said vehicle in said pipe.

5. A vehicle as claimed in claim 4 wherein said first and second sealing means are inflatable.

6. A vehicle as claimed in claim 5 wherein said first and second sealing means are annular in form.

7. A vehicle as claimed in claim 1 wherein said driving system comprises:
 a mounting frame;
 a motor connected to said mounting frame, said motor having a rotatable shaft;
 a worm attached to said shaft and rotatable therewith;
 a worm wheel forming a worm gear with said worm, said worm wheel having means connected thereto for engaging a clutch apparatus;
 at least one drive pulley joined to rotate with said worm wheel;
 a drive belt engaged to said drive pulley, said belt being driven by said drive pulley; and
 at least one idler pulley rotatably connected to said mounting frame and biased against said drive belt for increasing contact between said belt and the surface over which said vehicle moves.

8. A vehicle as claimed in claim 7 including:
 a follower pulley of the same size as said drive pulley and spaced therefrom;
 a second idler pulley rotatably connected to said mounting frame and biased against said drive belt; and
 means for biasing said idler pulley against said belt whereby said drive pulley and said follower pulley support said drive belt.

9. A vehicle as claimed in claim 8 including a clutch mechanism.

10. A vehicle as claimed in claim 9 wherein said clutch mechanism comprises:
   a first coupling element having engagement members at a first end thereof for contacting a second coupling element;
   a collar movable in a longitudinal direction and having a cam follower surface;
   means positioned between said collar and said coupling element movable in a longitudinal direction for transmitting motion of said collar to said first coupling element;
   means for biasing said first coupling element away from the second coupling element; and
   a laterally movable pin having a cam surface, said pin being movable between two positions in engagement with said collar wherein when said pin is moved to said first position, said collar is moved longitudinally toward the second coupling element to engage said second coupling element, and when said pin is moved to said second position, said biasing means moves said first coupling element away from the second coupling element.

11. A vehicle as claimed in claim 10 wherein:
   said collar has an annular cam follower surface;
   said pin includes four sections, a first section of small diameter, a second section of large diameter, a third section of small diameter, and a fourth section of large diameter, wherein when said pin is in its first position the second and fourth sections engage opposite portions of the annular cam follower surface of said collar and when said pin is in its second position, the first and third sections engage opposite portions of the annular surface.

12. A vehicle as claimed in claim 1 wherein said welding system includes a welder assembly having a fine adjustment mechanism, said assembly including a welding head; a support; means for pivotally mounting said welding head to said support; means connected to said support for guiding said welding head along a preselected welding path; and means connected to said support for moving said support along an annular path; the fine adjustment mechanism comprising:
   means for causing a rotational motion;
   a rotatable screw element;
   means for transmitting rotational motion from said rotational motion causing means to said screw element;
   means connected to said support for mounting said screw to allow only rotational movement; and
   block means mounted to said screw for non-rotational movement parallel to the longitudinal axis of said screw, said block means being connected to said welding head wherein said welding head is movable to allow adjustment whereby said welding head can be maintained along said preselected welding path.

13. A housing for a manned welding and inspection vehicle, said vehicle for movement through the interior of large diameter pipes and the like, and for welding pipes end to end, said housing having:
   an elongated generally tubular shape with a first end portion and a second end portion;
   a fan mounted to said second end portion for moving air from said first end portion toward said second end portion;
   first sealing means attached at said first end portion for restricting the flow of air along said housing;
   second sealing means attached at said second end portion for restricting the flow of air along the exterior of said housing;
   a plurality of velocity-increasing openings formed in said housing in communication with an air passage around said first sealing means, said openings located between said first and said second sealing means; and
   vent openings formed in said housing between said velocity increasing openings and said second sealing means for directing air to the interior of said housing;
   whereby an air flow pattern may be created within a conduit for providing sufficient cooling to a power source within said vehicle without causing a disruptive air current at the location where welding occurs.

14. A housing as claimed in claim 13 wherein said first and said second sealing means are inflatable.

15. A housing as claimed in claim 14 wherein said first and said second sealing means are each annular in form.

16. A housing for a manned welding and inspection vehicle, said vehicle for movement through the interior of large diameter pipes and the like and for welding pipes end to end:
   said housing having an elongated generally tubular shape with a first end portion and a second end portion;
   a first sealing means attached at said first end portion and a second sealing means attached at said second end portion; and
   said first sealing means and said second sealing means for restricting air flow along said housing and for aligning said vehicle in said pipe.

17. A housing as claimed in claim 16 wherein said first and said second sealing means are inflatable.

18. A housing as claimed in claim 17 wherein said first and said second sealing means are each annular in form.

19. A driving mechanism for a manned welding and inspection vehicle, said mechanism including:
   a frame;
   a motor connected to said frame, said motor having a rotatable shaft;
   a worm attached to said shaft and rotatable therewith;
   a worm wheel forming a worm gear with said worm, said worm wheel having means connected thereto for engaging a clutch apparatus;
   at least one drive pulley joined to rotate with said worm wheel;
   a drive belt engaged to said drive pulley, said belt being driven by said drive pulley; and
   at least one idler pulley rotatably connected to said frame and biased against said drive belt for increasing contact between said belt and the surface over which said vehicle moves.

20. A driving mechanism as claimed in claim 19 including:
   a follower pulley of the same size as said drive pulley and spaced therefrom;
   a second idler pulley rotatably connected to said frame and biased against said drive belt; and
   means for biasing said idler pulley against said belt whereby said drive pulley and said follower pulley support said drive belt.

21. A driving mechanism as claimed in claim 20 including a clutch mechanism.

22. A driving mechanism as claimed in claim 19 including a clutch mechanism.

23. A driving mechanism as claimed in claim 22 wherein said clutch apparatus comprises a first coupling element having engagement members at a first end thereof for contacting said worm wheel;
   a collar movable in a longitudinal direction and having a cam follower surface;
   means positioned between said collar and said coupling element movable in a longitudinal direction for transmitting motion of said collar to said first coupling element;
   means for biasing said first coupling element away from said worm wheel; and
   a laterally movable pin having a cam surface, said pin being movable between two positions in engagement with said collar wherein when said pin is moved to said first position said collar is moved longitudinally toward the worm wheel to engage said worm wheel, and when said pin is moved to said second position said biasing means moves said first coupling element away from said worm wheel.

24. A driving mechanism as claimed in claim 23 wherein said collar has an annular cam follower surface;
   said pin includes four sections, a first section of small diameter, a second section of large diameter, a third section of small diameter and a fourth section of large diameter wherein when said pin is in its first position the second and fourth sections engage opposite portions of the annular cam follower surface of said collar and when said pin is in its second position the first and third sections engage opposite portions of the annular surface.

25. A clutch mechanism for a manned welding and inspection vehicle, said clutch for engaging a driving mechanism whereby movement of said vehicle is provided, said clutch comprising;
   a first coupling element having engagement members at a first end thereof for contacting a second coupling element;
   a collar movable in a longitudinal direction and having a cam follower surface;
   means positioned between said collar and said coupling element movable in a longitudinal direction for transmitting motion of said collar to said first coupling element;
   means for biasing said first coupling element away from the second coupling element; and
   a laterally movable pin having a cam surface; said pin being movable between two positions in engagement with said collar wherein when said pin is moved to said first position said collar is moved longitudinally toward the second coupling element to engage said second coupling element, and when said pin is moved to said second position, said biasing means moves said first coupling element away from the second coupling element.

26. A clutch apparatus as claimed in claim 25 wherein:
   said collar has an annular cam follower surface;
   said pin includes four sections, a first section of small diameter, a second section of large diameter, a third section of small diameter, and a fourth section of large diameter, wherein when said pin is in its first position the second and fourth sections engage opposite portions of the annular cam follower surface of said collar and when said pin is in its second position, the first and third sections engage opposite portions of the annular surface.

* * * * *

UNITED STATES PATENT AND TRADEMARK OFFICE
CERTIFICATE OF CORRECTION

PATENT NO. : 4,000,701
DATED : January 4, 1977
INVENTOR(S) : Ostgaard, John T.; Doornbos, James M; Bartley, John; de Lange, Cor It is certified that error appears in the above-identified patent and that said Letters Patent are hereby corrected as shown below:

After the names of the inventors in "[ 76 ]" insert:

-- Said James M. Doornbos, John E. Bartley and Cor de Lange assignors to John T. Ostgaard. --

Signed and Sealed this

Seventeenth Day of May 1977

[SEAL]

Attest:

RUTH C. MASON
*Attesting Officer*

C. MARSHALL DANN
*Commissioner of Patents and Trademarks*